United States Patent
Park (10) Patent No.: US 9,853,952 B2
(45) Date of Patent: Dec. 26, 2017

(54) APPARATUS AND METHOD FOR ENCRYPTION

(71) Applicant: ELECTRONICS AND TELECOMMUNICATIONS RESEARCH INSTITUTE, Daejeon (KR)

(72) Inventor: Jong-Yeon Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 79 days.

(21) Appl. No.: 14/925,872

(22) Filed: Oct. 28, 2015

(65) Prior Publication Data
US 2016/0211970 A1 Jul. 21, 2016

(30) Foreign Application Priority Data
Jan. 15, 2015 (KR) ............ 10-2015-0007596

(51) Int. Cl.
*H04L 29/06* (2006.01)
*H04L 9/00* (2006.01)

(52) U.S. Cl.
CPC .......... *H04L 63/0428* (2013.01); *H04L 9/002* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 2010/0251285 A1* | 9/2010 | Eisen | ............ | H04N 7/163 725/31 |
| 2011/0116625 A1* | 5/2011 | Michiels | ............ | G06F 21/14 380/28 |
| 2011/0268271 A1* | 11/2011 | Benedetti | ............ | H04N 7/163 380/239 |
| 2012/0042170 A1* | 2/2012 | Curtin | ............ | G06F 21/77 713/185 |
| 2012/0163582 A1 | 6/2012 | Lee et al. | | |

(Continued)

FOREIGN PATENT DOCUMENTS

| KR | 10-2012-0032477 A1 | 4/2012 |
|---|---|---|
| KR | 10-2012-0072011 A1 | 7/2012 |
| KR | 10-2012-0079639 A1 | 7/2012 |

OTHER PUBLICATIONS

Jong-Yeon Park et al., "A Whitebox Cryptography Application for Mobile Device Security Against Whitebox Attacks", IEEE Computer Society, Oct. 28, 2014, pp. 173-176, Beijing, China.

(Continued)

*Primary Examiner* — Kambiz Zand
*Assistant Examiner* — Arezoo Sherkat (57) ABSTRACT

An encryption apparatus comprises a memory configured to store a predetermined program on a general domain and a security domain; and a processor configured to perform an encryption process based on the program, wherein the program is configured to: generate encoding data by encoding input data on the security domain, generate encryption data by performing encryption for the encoding data through a whitebox encryption module on the general domain, and generate output data by encoding the encryption data on the security domain.

10 Claims, 6 Drawing Sheets

(56) References Cited

U.S. PATENT DOCUMENTS

| | | | |
|---|---|---|---|
| 2012/0170740 A1 | 7/2012 | Lee et al. | |
| 2013/0042297 A1* | 2/2013 | Kim | G06F 21/53 726/1 |
| 2014/0295794 A1* | 10/2014 | Doumen | G06F 21/123 455/411 |
| 2014/0380311 A1* | 12/2014 | Deng | G06F 21/14 718/1 |
| 2015/0248668 A1* | 9/2015 | Radu | G06F 21/14 705/71 |
| 2015/0293911 A1* | 10/2015 | Tolhuizen | G09C 1/00 707/827 |
| 2016/0050190 A1* | 2/2016 | Mooij | H04L 12/2803 380/279 |
| 2016/0125201 A1* | 5/2016 | Villatel | G06F 9/46 726/30 |
| 2016/0180066 A1* | 6/2016 | Michiels | H04L 9/06 713/189 |
| 2017/0024230 A1* | 1/2017 | Li | G06F 8/41 |

OTHER PUBLICATIONS

Brecht Wyseur, Wyseur,"White-Box Cryptography: Hiding Keys in Software", White-box Cryptography, 2012, pp. 1-9.

Yaying Xiao et al., "A Secure Implementation of White-Box AES", IEEE Computer Society, 2009.

Yoni De Mulder et al., "Cryptanalysis of the Xiao—Lai White-Box AES Implementation", Selected Areas in Cryptography, 2013, pp. 34-49, vol. 7707.

Wil Michiels et al., "Opportunities in White-Box Cryptography", IEEE Computer and Reliability Societies, Jan./Feb. 2010, vol. 1540-7993, pp. 64.

* cited by examiner

APPARATUS AND METHOD FOR ENCRYPTION

CROSS REFERENCE TO RELATED APPLICATION

This application claims the benefit of Korean Patent Application No. 10-2015-0007596, filed on Jan. 15, 2015, entitled "Apparatus and method for encryption", which is hereby incorporated by reference in its entirety into this application.

BACKGROUND OF THE INVENTION

1. Technical Field

Exemplary embodiments of the present invention relate to an encryption technology and more particularly, to an encryption technology using an encryption table.

2. Description of the Related Art

Generally, a cryptographic algorithm assumes that an attacker cannot see an intermediate process of the operation of the cryptographic algorithm which is running. The assumption for an attack level of such an attacker is called as a "black-box" attack assumption. However, attacks in a code debug level such as memory manipulation, memory dump and the like are also possible in an actual environment. Assumption that an attacker can modify with knowing an attack operation median value is called as "whitebox" attack assumption. The cryptography designed to be remained secure against the whitebox attack assumption is called as "whitebox cryptography". The "whitebox cryptography" which is currently used is that an encryption key hides a table key to conceal the process of operation to provide identical result to that from the black-box cryptography through operation with a lookup table.

However, even though a key is hidden in an operation table, it is still vulnerable to a codelift attack which dumps the entire memory.

SUMMARY OF THE INVENTION

An object of the present invention is to provide an apparatus and a method for encryption which performs encryption through external encoding by using a virtual machine.

According to an aspect of the present invention, there is provided an encryption apparatus comprising: a memory configured to store a predetermined program on a general domain and a security domain; and a processor configured to perform an encryption process based on the program, wherein the program is configured to: generate encoding data by encoding input data on the security domain, generate encryption data by performing encryption for the encoding data through a whitebox encryption module on the general domain, and generate output data by encoding the encryption data on the security domain.

The program may be configured to: be stored on each of the general domain and the security domain; generate encoding data by encoding the input data on the security domain in accordance with the program stored on the security domain; generate output data by encoding the encryption data on the security domain; and generate encryption data by performing encryption for the encoding data through a whitebox encryption module on the general domain in accordance with the program stored on the general domain.

The security domain may be a region which is operated by a virtual machine.

The program may be configured to store the output data on the general domain and output the output data stored on the general domain to an external device.

According to another aspect of the present invention, there is provided an encryption apparatus comprising: a memory configured to store a predetermined program on a general domain and a security domain; a processor configured to perform an encryption process based on the program; and an external encoder configured to perform a predetermined encoding process, wherein the program may be configured to: generate encoding data by encoding input data through the external encoder, generate encryption data by performing encryption for the encoding data through a whitebox encryption module on the security domain, and generate output data by encoding the encryption data through the external encoder.

The program may be configured to: be stored on each of the general domain and the security domain, transmit the input data to the external encoder and receive the output data from the external encoder in accordance with the program stored on the general domain, and generate the encryption data by performing encryption for the encoding data through a whitebox encryption module on the security domain in accordance with the program stored on the security domain.

The security domain may be a region which is operated by a virtual machine.

The external encoder may be a universal subscriber identity module (USIM) which performs a predetermined encoding.

According to another aspect of the present invention, there is provided an encryption method in which an encryption apparatus performs encryption, the method comprising: generating encoding data by encoding input data on a security domain; generating encryption data by performing encryption for the encoding data through a whitebox encryption module on a general domain; and generating output data by encoding the encryption data on the security domain.

The step for generating encoding data by encoding input data on a security domain and the step for generating output data by encoding the encryption data on the security domain may be performed in accordance with the program stored on the security domain, and the step for generating encryption data by performing encryption for the encoding data through a whitebox encryption module on a general domain may be performed in accordance with the program stored on the general domain.

The security domain may be a region which is operated by a virtual machine.

The encryption method may further comprise storing the output data on the general domain and outputting the output data stored on the general domain to an external device.

DESCRIPTION OF THE EXEMPLARY EMBODIMENTS

The present invention will be described with reference to particular embodiments along with the accompanying drawings. However, it is to be appreciated that various changes and modifications may be made. The exemplary embodiments disclosed in the present invention do not limit but describe the spirit of the present invention, and the scope of the present invention is not limited by the exemplary embodiments.

When one element is described as being "transmitted" to another element, it shall be construed as being transmitted to the other element directly but also as possibly having another element in between.

Figure 1:
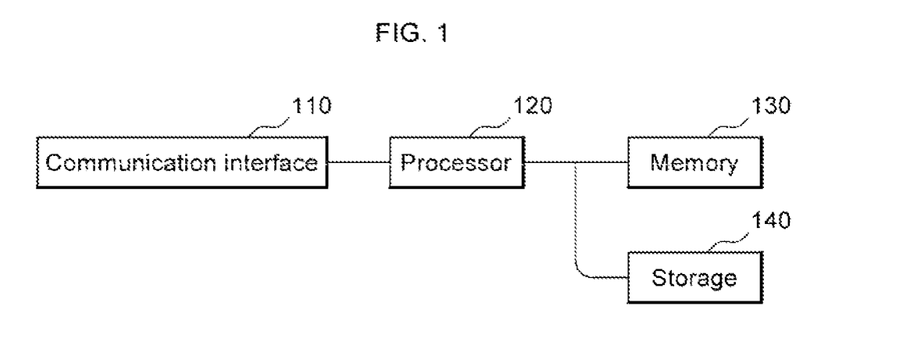
FIG. 1 is a block view illustrating an encryption apparatus according to an embodiment of the present invention.

FIG. 1 is a block view illustrating an encryption apparatus according to an embodiment of the present invention.

Referring to FIG. 1, an encryption apparatus may include a communication interface 110, a processor 120, a memory 130, and a storage 140.

The communication interface 110 may receive input data which is a target for encryption through communication in accordance with an external device connected with the encryption apparatus and a predetermined protocol. The communication interface 110 may also transmit output data of which encryption is completed to the external device.

The processor 110 may perform functions for encryption in accordance with a program loaded in the memory 130. The processor 110 may also operate a virtual machine in accordance with the program to perform the process which is performed in the virtual machine.

The memory 130 may store the program for encryption and transmit the program to the processor 120 in accordance with a request of the processor 120. The memory 130 may also store the program for encoding of the virtual machine. Here, the memory 130 may be a volatile memory.

The storage 140 may be a storing medium configured to store the program for encryption. The processor 120 may load the program stored in the storage 140 to the memory 130. The storage 130 may also store the program which is needed to operate the virtual machine.

Hereinafter, a process for performing encryption based on the program by an encryption apparatus according to an embodiment of the present invention will be explained in more detail.

Figure 2:
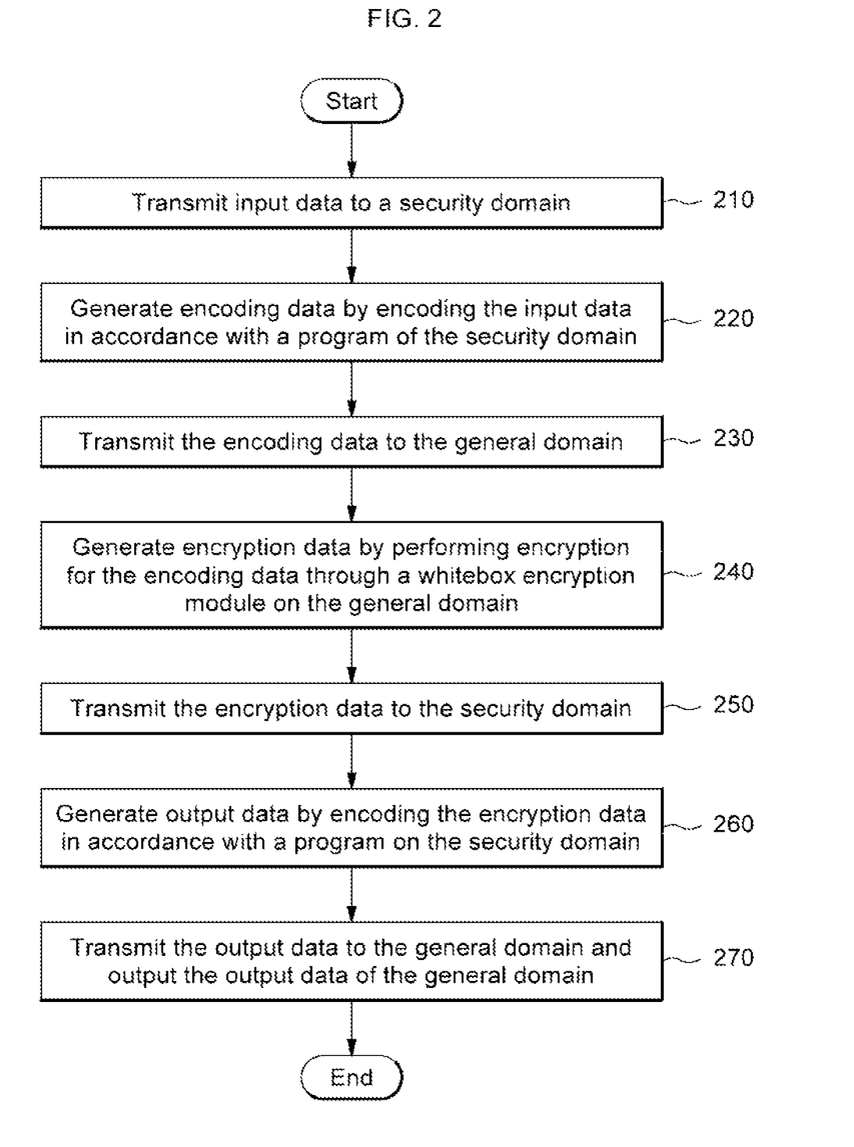
FIG. 2 is a flowchart illustrating a process for performing encryption using a virtual machine by an encryption apparatus according to an embodiment of the present invention.
Figure 3:
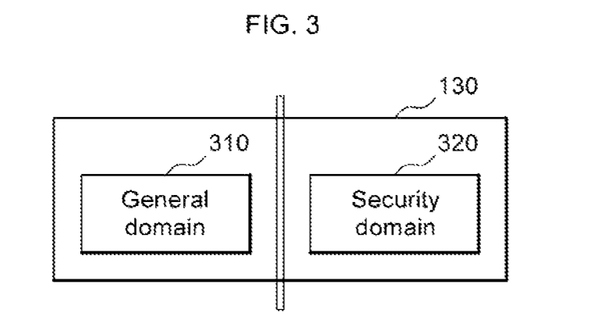
FIG. 3 is an exemplary view illustrating a general domain and a security domain in a memory of an encryption apparatus according to an embodiment of the present invention.

FIG. 2 is a flowchart illustrating a process for performing encryption using a virtual machine by an encryption apparatus according to an embodiment of the present invention, and FIG. 3 is an exemplary view illustrating a general domain and a security domain in a memory of an encryption apparatus according to an embodiment of the present invention. Each step to be explained below is a process that the processor 120 of the encryption apparatus performs by being interconnected with each functional unit. However, a subject will be collectively called as the encryption apparatus and detailed explanation relating to general processes for performing in a computing device such as well-known signal transmissions among the processor 120, the memory 130, and the storage 140 will be omitted.

In Step 210, the encryption apparatus may transmit received input data to a security domain through the communication interface 110. As shown in FIG. 3, the memory 130 may be composed of a general domain 310 and a security domain 320. The security domain 320 is a region of the memory 130 in a virtual machine and the general domain 310 is the rest region except the security domain 320. Therefore, general applications in the encryption apparatus may be allowed to access only to the data on the general domain 310 but not to the data on the security domain 320.

In Step 220, the encryption apparatus may generate encoding data by encoding the input data in accordance with a program of the security domain 320. That is, the encryption apparatus may generate encoding data by encoding the input data in the virtual machine in accordance with a predetermined program.

In Step 230, the encryption apparatus may transmit the encoding data to the general domain 310.

In Step 240, the encryption apparatus may generate encryption data by performing encryption for the encoding data through a whitebox encryption module on the general domain 310. Here, the whitebox encryption module may be a software module which is able to access to the general domain which performs whitebox encryption.

In Step 250, the encryption apparatus may transmit the encryption data to the security domain 320.

In Step 260, the encryption apparatus may generate output data by encoding the encryption data on the security domain 320. Here, the encoding process in Step 220 may be different from that in Step 260.

In Step 270, the encryption apparatus may transmit the output data to the general domain 310 and output the output data of the general domain 310 through the communication interface 110.

Figure 4:
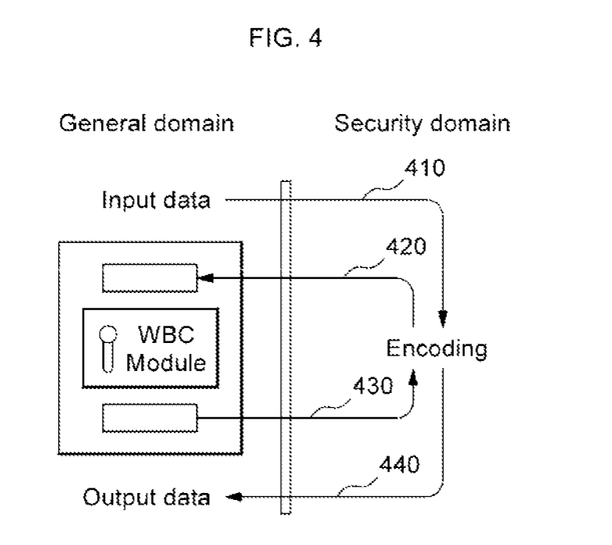
FIG. 4 is a conceptual view illustrating a process for performing encryption using a virtual machine by an encryption apparatus according to an embodiment of the present invention.

FIG. 4 is a conceptual view illustrating a process for performing encryption using a virtual machine by an encryption apparatus according to an embodiment of the present invention.

Referring to FIG. 4, the data on the security domain 320 of an encryption apparatus according to an embodiment of the present invention may be accessed only by a processor which is configured to operate on the security domain 320. Thus, the software which operates on the general domain 310 may not be involved in processes on the security domain 320, except processes for transmitting data to the security domain 320, 410 & 430, or processes for receiving data from the security domain 320, 420 & 440.

When a codelift attack is caused to the encryption apparatus, only the data on the general domain 310 may be dumped so that a codelift attacker may identify the algorithm which the whitebox encryption module performs, but may not be possible to identify the encoding algorithm which the security domain 320 performs.

Accordingly, the encryption apparatus according to an embodiment of the present invention is able to ensure security against codelift attacks.

Figure 5:
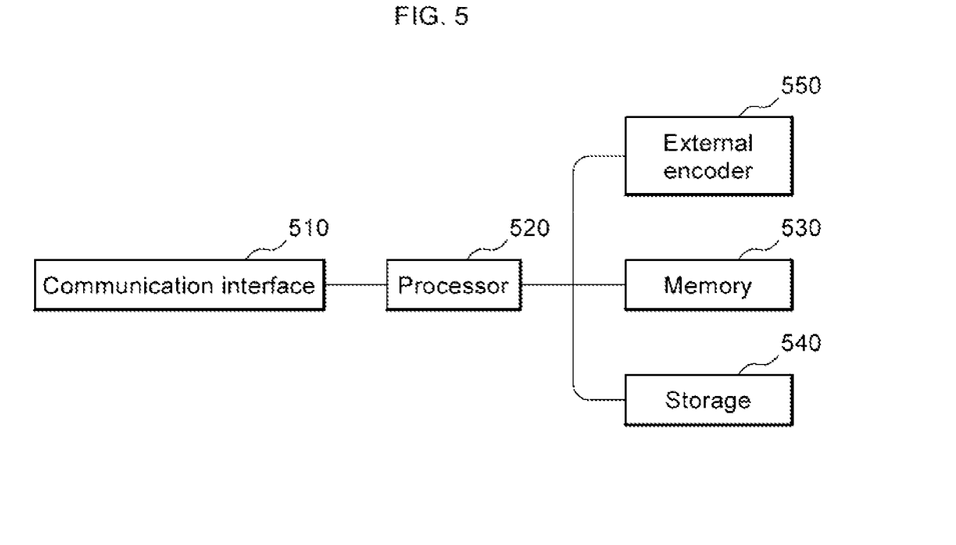
FIG. 5 is a block view illustrating an encryption apparatus according to another embodiment of the present invention.

FIG. 5 is a block view illustrating an encryption apparatus according to another embodiment of the present invention.

Referring to FIG. 5, an encryption apparatus may include a communication interface 510, processor 520, a memory 530, a storage 540 and an external encoder 550.

The communication interface 510 may receive input data which is a target for encryption through communication according to an external device connected with the encryption apparatus and a predetermined protocol. The communication interface 510 may also transmit output data of which encryption is completed to the external device.

The processor 520 may perform functions for encryption in accordance with a program loaded in the memory 530. The processor 520 may also operate a virtual machine in accordance with the program to perform the process which is performed in the virtual machine.

The memory 530 may store the program for encryption. The processor 520 may access to the program stored in the memory 530. The memory 530 may include the general domain 310 and the security domain 320 having the same structure described with reference to FIG. 3. The memory 530 may store the program for encoding of the virtual machine on the security domain 320. Here, the memory 530 may be a volatile memory.

The storage 540 may be a storing medium configured to store the program for encryption. The processor 520 may load the program stored in the storage 540 to the memory 530. The storage 530 may also store the program which is needed to operate the virtual machine.

The external encoder 550 may include a processor and a memory therein and perform encoding in accordance with a program stored in its own memory. For example, the external encoder 550 may be a module, which can be mounted in the encryption apparatus, such as a universal subscriber identity module (USIM).

Figure 6:
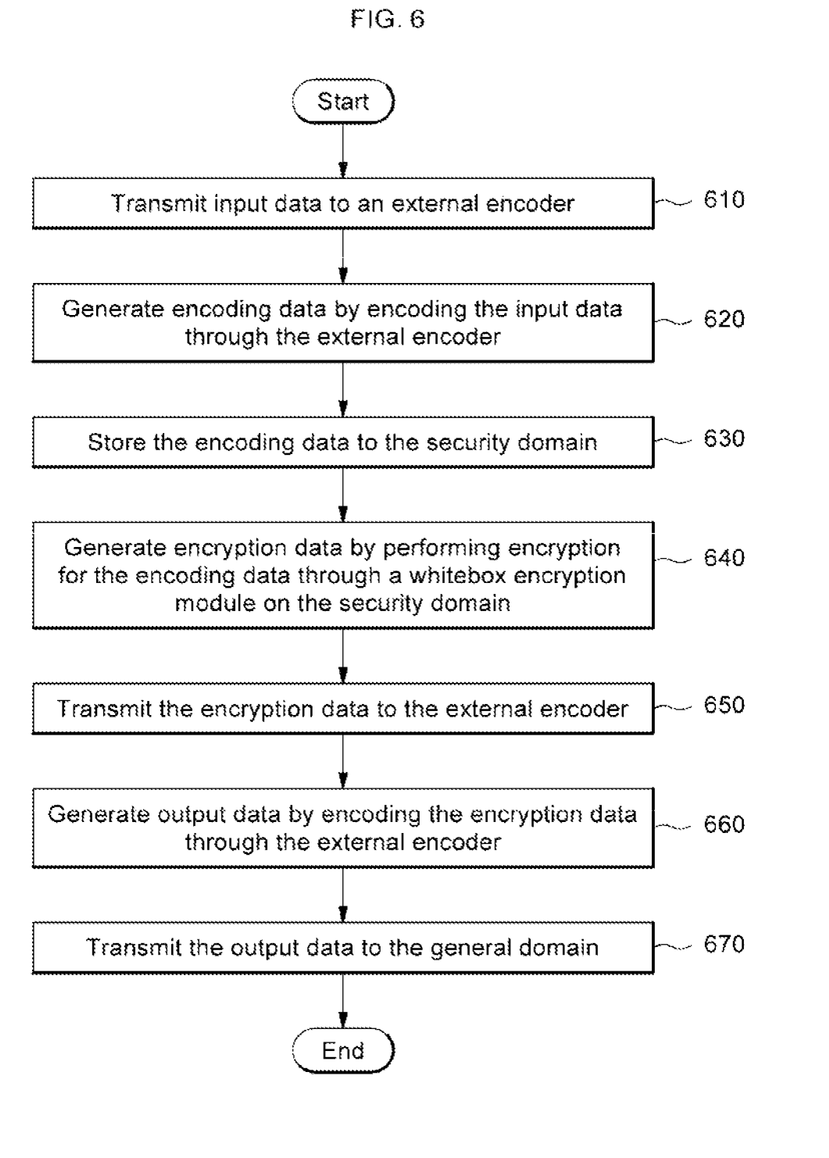
FIG. 6 is a flowchart illustrating a process for performing encryption using a virtual machine and an external encoder by an encryption apparatus according to another embodiment of the present invention.

FIG. 6 is a flowchart illustrating a process for performing encryption using a virtual machine and an external encoder by an encryption apparatus according to another embodiment of the present invention.

Referring to FIG. 6, in Step 610, the encryption apparatus may transmit input data to the external encoder 550.

In Step 620, the encryption apparatus may generate encoding data by encoding the input data through the external encoder 550.

In Step 630, the encryption apparatus may store the encoding data generated from the external encoder 550 on the security domain 320.

In Step 640, the encryption apparatus may generate encryption data by performing encryption for the encoding data through a whitebox encryption module on the security domain 320. Here, the whitebox encryption module may be a software module which is able to operate on the security domain 320.

In Step 650, the encryption apparatus may transmit the encryption data to the external encoder 550.

In Step 660, the encryption apparatus may generate output data by encoding the encryption data through the external encoder 550. Here, the encoding process in Step 520 may be different from that in Step 560.

In Step 670, the encryption apparatus may transmit the output data to the general domain 310 and output the output data of the general domain 310 to the external device.

Figure 7:
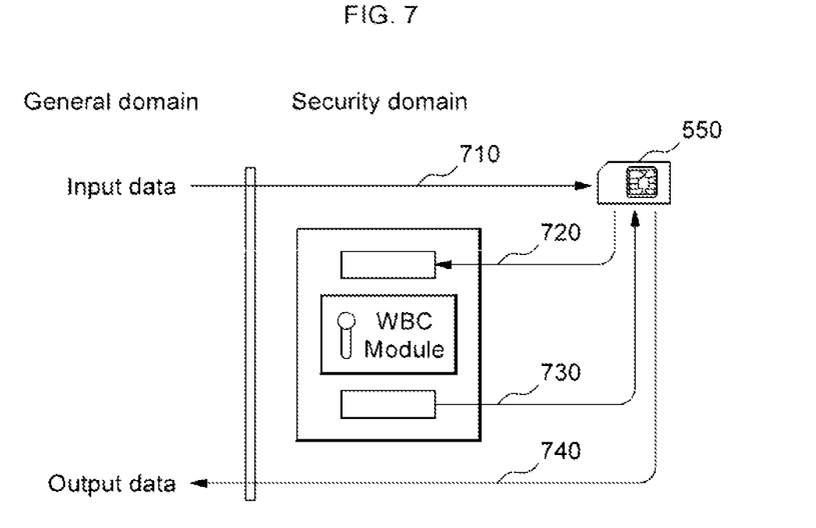
FIG. 7 is a conceptual view illustrating a process for performing encryption using a virtual machine and an external encoder by an encryption apparatus according to another embodiment of the present invention.

FIG. 7 is a conceptual view illustrating a process for performing encryption using a virtual machine and an external encoder by an encryption apparatus according to another embodiment of the present invention.

Referring to FIG. 7, the data on the security domain 320 of an encryption apparatus according to an embodiment of the present invention may be accessed only by a processor which is configured to operate on the security domain 320.

Thus, when a codelift attack is caused to the encryption apparatus, only the data on the general domain 310 may be dumped so that a codelift attacker may identify a process of Step 710 for transmitting data to the external encoder 550 (Step 710) or a process of Step 740 for transmitting data from the external encoder 550 to the general domain, but may not be possible to identify the algorithm which the whitebox encryption module performs on the security domain 320.

In addition, when another codelift attack is caused on the security domain 320 of the encryption apparatus, since an encoding process is performed in the external encoder 550, a codelift attacker may identify a process of Step 720 for receiving data from the whitebox encryption algorithm and the external encoder 550 and a process of Step 730 for transmitting data to the external encoder 550, but may not be possible to identify the algorithm for the entire encryption processes.

Accordingly, when the encryption apparatus according to an embodiment of the present invention performs encryption through a virtual machine and an external encoder, even though a codelift attack is caused to the general domain 310 and the security domain 320, security may be ensured.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the invention. The scope of the present invention should be interpreted by the following claims and it should be interpreted that all spirits equivalent to the following claims fall with the scope of the present invention.

What is claimed is:

1. An encryption apparatus comprising:
   a memory including a general domain and a security domain and configured to store a predetermined program in each of the general domain and the security domain; and
   a microprocessor configured to perform an encryption process of input data based on the predetermined program,
   wherein microprocessor performs a method comprising:
      transmitting the input data to the security domain;
      generating encoding data by encoding the input data in the security domain using a first encoding process;
      transmitting the encoding data to the general domain;
      generating encryption data by performing encryption for the encoding data using a whitebox encryption module in the general domain;
      transmitting the encryption data to the security domain;
      generating output data by encoding the encryption data in the security domain using a second encoding process; and
      transmitting the output data to the general domain,
      wherein the output data is stored in the general domain and output to an external device, and
   wherein the security domain is a region within a virtual machine accessed only by applications within the virtual machine, wherein applications within the general domain are allowed access only to data in the general domain which prevents a codelift attacker from accessing and identifying an algorithm performed in the security domain.

2. The encryption apparatus of claim 1, wherein generating the encoding data and generating the output data are performed in accordance with the predetermined program stored in the security domain, and
   wherein generating the encryption data is performed in accordance with the predetermined program stored in the general domain.

3. An encryption apparatus comprising:
a memory including a general domain and a security domain and configured to store a predetermined program in each of the general domain and the security domain;
a microprocessor configured to perform an encryption process of input data based on the predetermined program; and
an external encoder being separate from the memory and configured to perform a predetermined encoding process,
wherein the microprocessor performs a method comprising:
transmitting the input data to the external encoder;
generating encoding data by encoding the input data through the external encoder using a first encoding process;
transmitting the encoding data to the security domain;
generating encryption data by performing encryption for the encoding data using a whitebox encryption module in the security domain;
transmitting the encryption data to the external encoder;
generating output data by encoding the encryption data through the external encoder using a second encoding process; and
transmitting the output data to the general domain,
wherein the output data is stored in the general domain and output to an external device, and
wherein the security domain is a region within a virtual machine accessed only by applications within the virtual machine, wherein applications within the general domain are allowed access only to data in the general domain which prevents a codelift attacker from accessing and identifying an algorithm performed in the security domain.

4. The encryption apparatus of claim 3, wherein generating the encryption data is performed in accordance with the predetermined program stored in the security domain.

5. The encryption apparatus of claim 3, wherein the external encoder is mounted in a universal subscriber identity module (USIM) which performs a predetermined encoding.

6. An encryption method performed in an encryption apparatus, the encryption apparatus including a memory, the method comprising:
receiving input data from an external device;
transmitting the input data to a security domain in the memory;
generating encoding data by encoding the input data in the security domain using a first encoding process;
transmitting the encoding data to a general domain in the memory;
generating encryption data by performing encryption for the encoding data using a whitebox encryption module in the general domain;
transmitting the encryption data to the security domain;
generating output data by encoding the encryption data in the security domain using a second encoding process; and
transmitting the output data to the general domain,
wherein the output data is stored in the general domain and output to an external device, and
wherein the security domain is a region within a virtual machine accessed only by applications within the virtual machine, wherein applications within the general domain are allowed access only to data in the general domain which prevents a codelift attacker from accessing and identifying an algorithm performed in the security domain.

7. The encryption method of claim 6, wherein the memory is configured to store a predetermined program in each of the general domain and the security domain,
wherein generating the encoding data and generating the output data are performed in accordance with the predetermined program stored in the security domain, and
wherein generating the encryption data is performed in accordance with the predetermined program stored in the general domain.

8. The encryption apparatus of claim 1, wherein the first encoding process and the second encoding process use different encoding schemes.

9. The encryption apparatus of claim 3, wherein the first encoding process and the second encoding process use different encoding schemes.

10. The encryption method of claim 6, wherein the first encoding process and the second encoding process use different encoding schemes.

* * * * *